(12) United States Patent
Kaijala

(10) Patent No.: US 8,522,642 B2
(45) Date of Patent: Sep. 3, 2013

(54) MOUNTING ASSEMBLY AND INSERT FOR A PEDAL OR THE LIKE

(75) Inventor: Murray Kaijala, Elkhart, IN (US)

(73) Assignee: CTS Corporation, Elkhart, IN (US)

( * ) Notice: Subject to any disclaimer, the term of this patent is extended or adjusted under 35 U.S.C. 154(b) by 760 days.

(21) Appl. No.: 12/695,789

(22) Filed: Jan. 28, 2010

(65) Prior Publication Data

US 2010/0186546 A1    Jul. 29, 2010

Related U.S. Application Data

(60) Provisional application No. 61/206,310, filed on Jan. 29, 2009.

(51) Int. Cl.
*G05G 1/30* (2008.04)
*F16M 13/00* (2006.01)

(52) U.S. Cl.
USPC ............. 74/560; 74/512; 248/224.7; 248/903

(58) Field of Classification Search
USPC ........... 74/512–514, 560; 248/222.14, 224.7, 248/903; 411/546, 547, 903; 403/408.1; 384/437–440
See application file for complete search history.

(56) References Cited

U.S. PATENT DOCUMENTS

| 942,693 | A | * | 12/1909 | Wintermute | 403/276 |
|---|---|---|---|---|---|
| 2,446,857 | A | * | 8/1948 | Snyder | 238/349 |
| 3,618,443 | A | * | 11/1971 | Fitzner | 411/352 |
| 4,126,954 | A | * | 11/1978 | Plummer | 42/77 |
| 5,144,852 | A | * | 9/1992 | Yokoyama | 74/473.36 |
| 6,375,499 | B1 | | 4/2002 | Lin | |
| 6,461,073 | B1 | * | 10/2002 | Ikegami | 403/375 |
| 7,353,729 | B2 | * | 4/2008 | Willemsen et al. | 74/512 |
| 2008/0276749 | A1 | | 11/2008 | Stewart et al. | |

FOREIGN PATENT DOCUMENTS

| DE | 36 32 312 | 3/1988 |
|---|---|---|
| DE | 20 2005 003526 | 2/2006 |
| FR | 2 136 292 | 12/1972 |

* cited by examiner

*Primary Examiner* — Thomas Diaz
(74) *Attorney, Agent, or Firm* — Daniel J. Deneufbourg

(57) ABSTRACT

A mounting assembly which, in one embodiment, is for a pedal assembly including a plate with at least a first mounting bracket including an interior wall which, in one embodiment, defines an aperture and a pair of slots. A sleeve is fitted in the opening and, in one embodiment, is generally U-shaped and includes both an arcuate base and a pair of arms. The base is fitted in the aperture and at least the distal end of the pair of arms is fitted in the pair of slots respectively. The interior wall is configured so that, in one embodiment, a generally circular aperture is defined in the bracket when the sleeve is fitted therein; and, in another embodiment, a generally oval-shaped aperture is defined in the bracket when the sleeve is fitted therein.

3 Claims, 4 Drawing Sheets

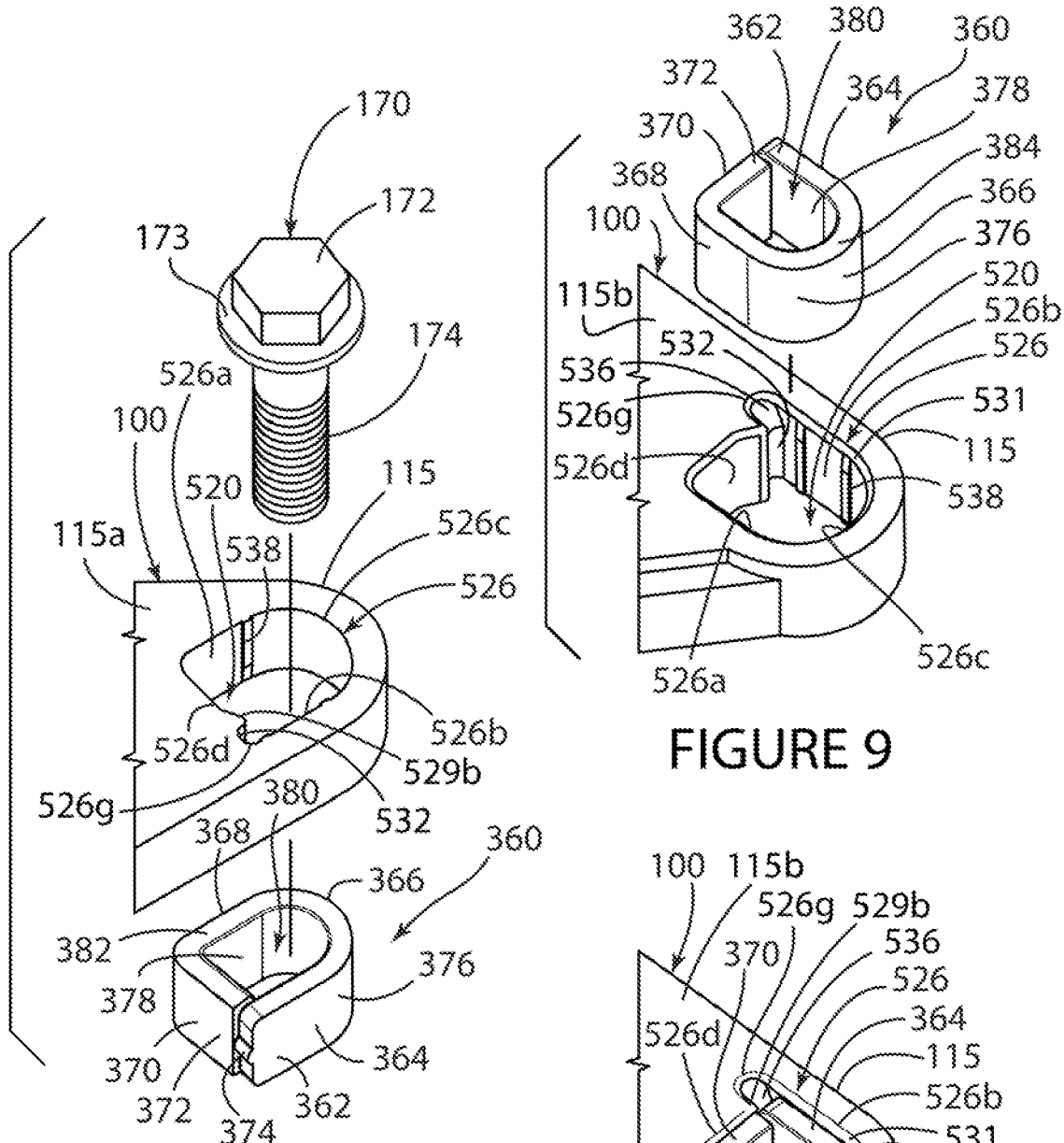
FIGURE 8
FIGURE 9
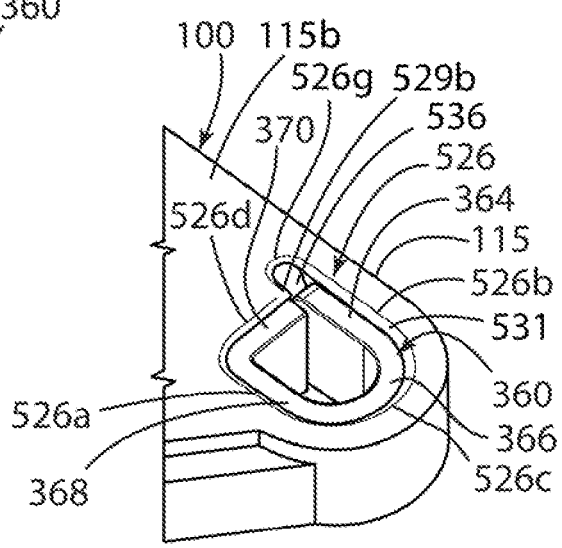
FIGURE 10

MOUNTING ASSEMBLY AND INSERT FOR A PEDAL OR THE LIKE

CROSS-REFERENCE TO RELATED APPLICATION

This application claims the benefit of the filing date and disclosure of U.S. Provisional Application Ser. No. 61/206,310, filed on Jan. 29, 2009 which is explicitly incorporated herein by reference as are all references cited therein.

FIELD OF THE INVENTION

This invention relates generally to a mounting assembly and insert for plastic assemblies and, in particular, to a mounting assembly and insert for a vehicle accelerator pedal assembly.

BACKGROUND OF THE INVENTION

The present invention relates to assemblies for mounting a plastic component to another component such as, for example, assemblies for mounting a vehicle accelerator pedal assembly to the floor of the vehicle and, more specifically, to a firewall or pedal rack on the floor of the vehicle. Typically, the pedal assembly includes a plastic housing with mounting flanges/brackets and associated mounting inserts fitted in appropriate apertures in the mounting flanges, and appropriate fasteners extend through the respective inserts and mounting flanges and into the firewall or pedal rack.

Currently, the mounting flanges/brackets include a round aperture which receives a closed circular-shaped insert and/or an oval aperture which receives a closed oval-shaped insert. Efforts to reduce the cost of the components of plastic assemblies such as pedal assemblies have been ongoing, and the present invention is directed to a low cost mounting assembly and insert for plastic assemblies such as pedal assemblies.

SUMMARY

The present invention relates broadly to a mounting assembly which, in one embodiment, comprises a housing including an interior wall defining an aperture and a first guide surface defining a first slot which opens into the aperture; and a sleeve which is fitted in the aperture and includes a projection adapted to slide against the guide surface when the sleeve is fitted in the aperture.

In one embodiment, the sleeve is generally U-shaped and includes a generally arcuate base fitted in the aperture and first and second spaced-apart arms including first and second distal ends. The plate further comprises a second guide surface defining a second slot which opens into the aperture and the first and second distal ends of the first and second arms extend into the first and second slots respectively. The interior wall is configurable such that, in one embodiment, the interior wall and the sleeve in combination define a generally circular aperture in the plate; and, in another embodiment, the interior wall and the sleeve in combination define a generally oval-shaped aperture in the plate.

In another embodiment, the sleeve is defined by a strip of material which includes first and second distal ends and has been bent and shaped to form a generally circular sleeve wherein the first and second distal ends are oriented in a normal relationship. In another embodiment, the strip of material is bent and shaped to define a generally oval-shaped sleeve.

In a still more specific embodiment, the mounting assembly is a pedal mounting assembly which comprises a first mounting bracket which includes a first interior wall defining a first aperture and first and second slots, a second mounting bracket which includes a second interior wall defining a second aperture and first and second slots, and a sleeve which includes a base and first and second arms. The sleeve is fitted in the first and second apertures respectively and the first and second arms are fitted in the first and second slots respectively. The first interior wall is configured so that the first aperture is generally oval in shape when the sleeve is fitted therein and the second interior wall is configured so that the second aperture is generally circular in shape when the sleeve is fitted therein.

In the above embodiment, the sleeve and the first and second interior walls are each generally U-shaped and include a generally arcuate base. The first and second arms of the sleeve extend outwardly from opposed ends of the arcuate base of the sleeve in an opposed, spaced-apart, and parallel relationship and the first and second slots defined in each of the first and second mounting brackets extend in an opposed, spaced-apart relationship.

These and other objects, features and advantages will become snore apparent in light of the text, drawings and claims.

BRIEF DESCRIPTION OF THE DRAWINGS

In the accompanying drawings that form part of the specification, and in which like numerals are employed to designate like parts throughout the same:

FIG. 8 is an enlarged, broken, exploded, perspective view of the first mounting bracket of the pedal mounting assembly of the present invention with yet another embodiment of a mounting insert also in accordance with the present invention;

FIG. 9 is an enlarged, broken, exploded, perspective view of the opposite side of the first mounting bracket and associated mounting insert shown in FIG. 8; and FIG. 10 is an enlarged, broken, perspective view of the first mounting bracket with the mounting insert of FIGS. 8 and 9 press-fitted therein.

DETAILED DESCRIPTION

Figure 1:
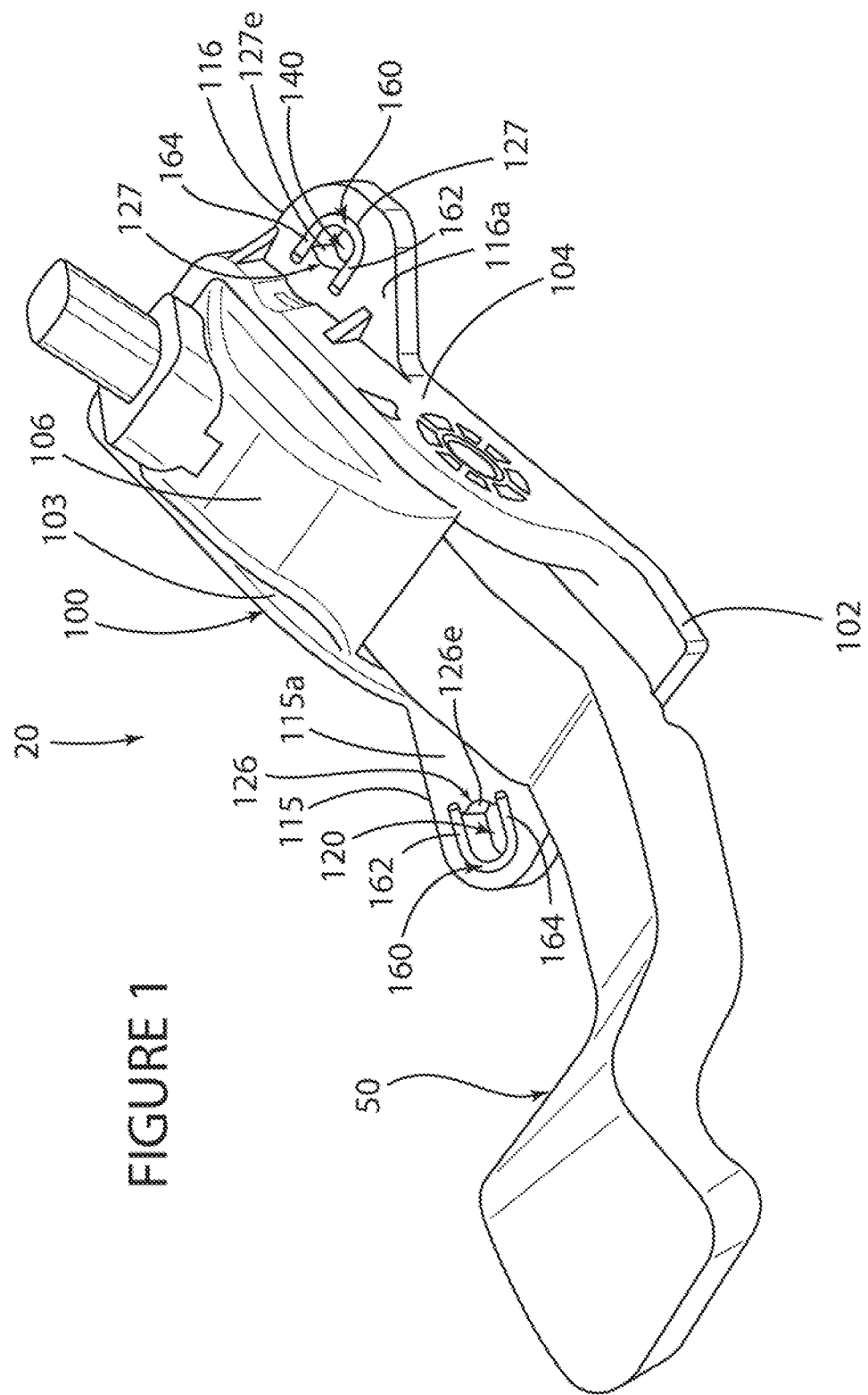
FIG. 1 is an overall perspective view of a vehicle accelerator pedal assembly incorporating a pedal mounting assembly and inserts in accordance with the present invention.
Figure 2:
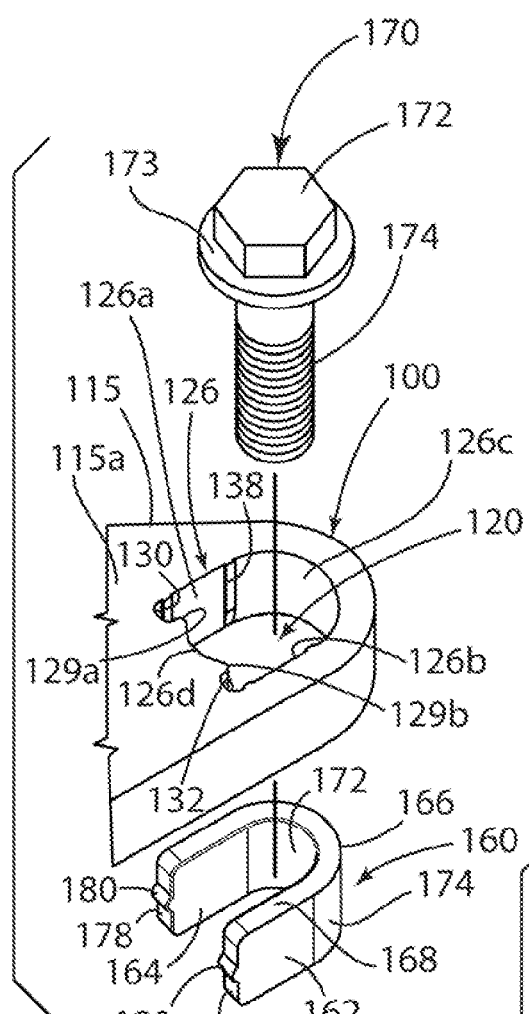
FIG. 2 is an enlarged, broken, exploded, perspective view of the first mounting bracket and associated mounting insert of the pedal mounting assembly of the present invention.

While this invention is susceptible to embodiment in many different forms, this specification and the accompanying drawings disclose only three of the exemplary forms of the mounting assembly inserts of the invention. The invention is not intended to be limited to the insert embodiments or mounting assembly so described, however. The scope of the invention is identified in the appended claims.

A plastic assembly in the form of an accelerator pedal assembly 20 incorporating one embodiment of the mounting assembly and associated mounting insert of the present invention is shown in FIGS. 1-4. Pedal assembly 20 includes a pedal housing 100 and a pedal arm 50 that is rotatably mounted to the pedal housing 100. The interior of housing 100 contains the components of the pedal assembly 20. Housing 100 is adapted for mounting to a firewall or floor of a vehicle (not shown) and can be formed from molded plastic. Pedal housing 100 has, and is defined by, a generally planar or flat bottom mounting wall or plate 102, side walls 103 and 104, and a top wall 106. Side walls 103 and 104 are generally parallel and opposed to each other and oriented perpendicular to bottom plate 102 and top wall 105.

A pair of mounting flanges or brackets 115 and 116 extend outwardly from diametrically opposed corners of the flat bottom plate 102. In the embodiment shown, flange 115 is located adjacent the lower corner of side wall 103 and projects outwardly from the corner of the plate 102 at a forty-five degree angle: and flange 116 is located adjacent the top corner of side wall 104 and projects generally normally outwardly from the corner of the plate 102.

A generally U- or horseshoe-shaped interior mounting opening or aperture or through-hole 120 (FIGS. 1, 2, and 3) extends through and between the respective opposed exterior top and bottom surfaces 115a and 115b (FIGS. 1 2, and 3) of mounting flange or bracket 115. Aperture 120 is disposed in flange 115 at a forty-five degree angle relative to the side wall 103 of housing 100.

Similarly, a generally U- or horseshoe-shaped interior mounting opening or aperture or through-hole 140 (FIGS. 1 and 4) extends through and between the respective opposed exterior top and bottom surfaces 116a and 116b (FIGS. 1 and 4) of mounting flange or bracket 116. Aperture 140 is disposed in flange 116 in an orientation generally normal to the side wall 104 of housing 100.

The opening or aperture 120 is defined in part by a generally U-shaped interior vertical and continuous flange surface or wall 126 (FIGS. 1-3) which extends generally normally between the respective top and bottom flange surfaces 115a and 115b. Wall 126 includes opposed, spaced-apart, parallel elongate straight interior wall segments 126a and 126b, an arcuate base wall segment 126c located adjacent the arcuate outside periphery of the flange 115 and extending between the first ends of the two straight segments 126a and 126b, and a curved interior wall segment 126d opposite the arcuate base segment 126c and between and joining the opposite second ends of the two straight wall segments 126a and 126b.

The curved wall segment 126d in turn includes a central arcuate wall portion 126e (FIG. 3) defining a pair of retention fingers 129a and 129b which project and extend into the interior of aperture 120. Interior wall segment 126d further includes a pair of spaced-apart arcuate and generally U-shaped end wall portions 126f and 126g projecting and extending in the direction of the sidewall 103 of housing 100, i.e., in a direction opposite the fingers 129a and 129b. The wall portion 126f is located between the wall segment 126a and the associated retention finger 129a and defines a generally U-shaped groove or slot or recess 130 which opens into the aperture 120. The wall segment 126g is located between the wall segment 126b and the retention finger 129b and defines a generally U-shaped groove or slot or recess 132 which is located opposite, spaced from, and parallel to the slot 130, and also opens into the aperture 120. The wall portions 126f and 126g include respective beveled or angled guide surfaces or faces or ramps 134 and 136 which slope inwardly and downwardly from the surface 115b of flange 115 into the respective slots 130 and 132 and in the direction of the surface 115a of flange 115.

Each of the wall segments 126a and 126b includes a plurality of spaced-apart, generally vertically oriented crush ribs 138 which project outwardly from the respective outer face thereof and extend between the opposed surfaces 115a and 115b of the flange 115.

Figure 3:
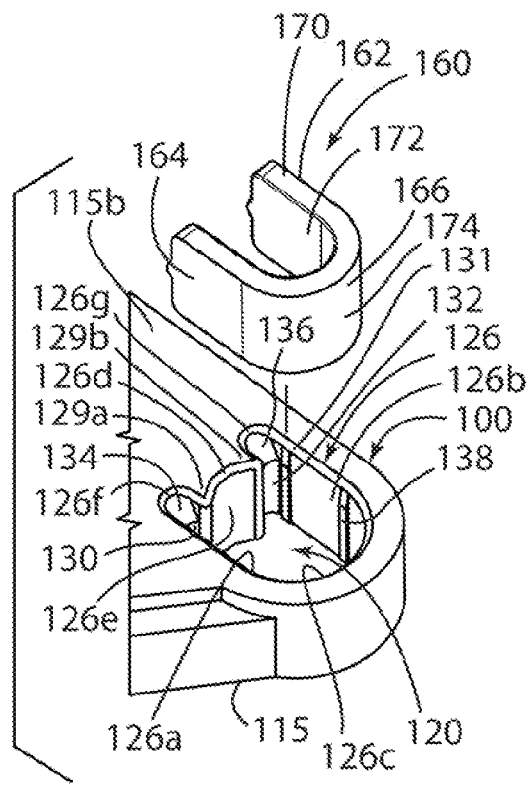
FIG. 3 is an enlarged, broken, exploded, perspective view of the opposite side of the first mounting bracket and associated mounting insert shown in FIG. 2.

Further, and as shown in FIG. 3, the wall 126 includes a continuous peripheral edge 131 on flange surface 115b which is beveled and angled so as to define a guiding surface or ramp for a mounting insert 160 as described in more detail below.

Aperture or opening 140 (FIGS. 1 and 4) is defined by a generally U- or horseshoe-shaped interior vertical and continuous surface or wall 127 which extends through and between the top and bottom surfaces 116a and 116b of the flange 116. The wall 127 includes opposed, spaced-apart, parallel, elongate interior straight wall segments 127a and 127b, an arcuate interior base wall segment 127c extending between and joining together the first ends of the two straight segments 127a and 127b and located adjacent the peripheral outside edge of flange 116, and a curved wall segment 127d opposite the arcuate base wall segment 127c and extending between and joining the opposed second ends of the two straight wall segments 127a and 127b.

The curved wall segment 127d in turn includes a central arcuate and concave wall portion 127e (FIG. 5) defining a pair of retention fingers 133a and 133b which project and extend into the interior of aperture 140. The wall segment 127d further includes a pair of spaced-apart, arcuate, and generally U-shaped end wall portions 127f and 127g projecting and extending in the direction of the sidewall 104 of housing 100, i.e., in a direction opposite the direction of the retention fingers 133a and 133b. Wall portion 127f is located between the wall segment 127a and the retention finger 133a and defines a generally U-shaped groove or slot or recess 150 which opens into the aperture 140. The wall portion 127g is located between the wall segment 127b and the retention finger 133b and defines a generally U-shaped groove or slot or recess 152, which is located opposite of, spaced from, and parallel to the slot 150, and likewise opens into the aperture 140.

The end wall portions 127f and 127g further include respective beveled or angled guide surfaces or faces or ramps 154 and 156 which slope downwardly from the surface 116b of flange 116 into the respective slots 150 and 152 and in the direction of the opposite surface 116a of flange 116.

Each of the straight wall segments 127a and 127b includes a plurality of spaced-apart, generally vertically oriented crush ribs 158 which project outwardly from the respective outer faces thereof and extend between the opposed surfaces 116a and 116b of the flange 116.

Figure 4:
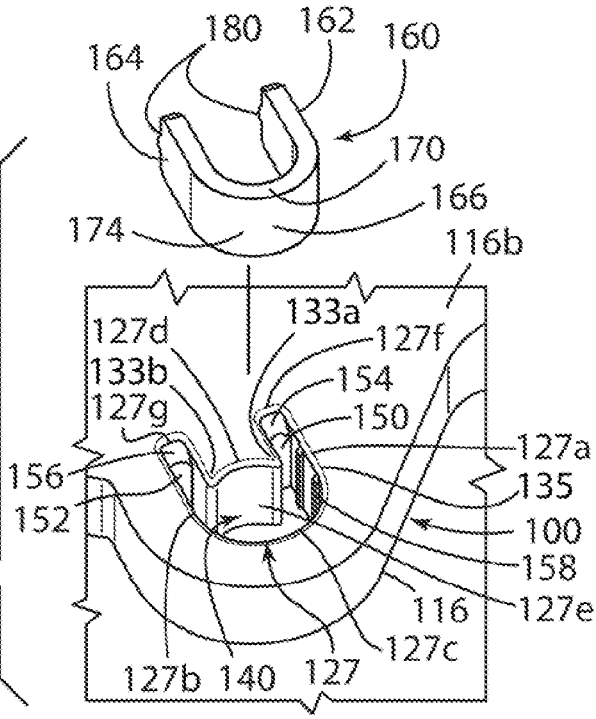
FIG. 4 is an enlarged, broken, exploded, perspective view of one of the sides of the second mounting bracket and associated mounting insert shown in FIG. 1.

Further, and as shown in FIG. 4, the wall 127 includes a continuous peripheral edge 135 on flange surface 116b which is beveled and angled so as to define a guide surface or ramp for the mounting insert 160 as described in more detail below.

The interior wall 127 in flange 116 differs in configuration and size from the interior wall 126 in flange 115 in that the distance between the arcuate wall segment 127c and opposed curved wall portion 127e of wall 127 in flange 116 is shorter than the distance between the arcuate wall segment 126c and opposed curved wall portion 126e of wall 126 in flange 115, thus making the slots 150 and 152 in flange 116 longer and deeper than the corresponding slots 130 and 132 in flange 115 and thus making the aperture 140 in flange 116 smaller in size and area than the aperture 120 in flange 115.

A generally U- or horseshoe-shaped sleeve, insert, washer, or bushing 160 (FIGS. 1-4), which may be made of any suitable strip of metal such as steel or the Ike which has been stamped and subsequently bent and shaped, is press fit into each of the apertures 120 and 140. In the embodiment of FIGS. 14, sleeve 160 is generally U- or horseshoe-shaped and includes a pair of generally parallel spaced-apart elongate arms 162 and 164 joined together by a generally arcuate base 166. Sleeve 160 includes a top surface 168, a bottom surface 170, an inner surface 172, an outer surface 174, and distal end faces 176 and 178 defined at the end of respective arms 162 and 164. A rib or projection 180 extends outwardly from each of the end faces 176 and 178 in a direction and orientation generally normal to, and extending between, the inner and outer surfaces 172 and 174 respectively.

The sleeve 160 is press fit into the aperture 120 in the flange 115 from and through the surface 115b into a relationship in which the outer surface 174 of the arm 164, the arm 162, and the base 166 in sleeve 160 are positioned in abutting relationship with and against the interior surface of flange wall segments 126a, 126b, and 126c respectively; the distal end of the respective sleeve arms 162 and 164 are fitted in the respective slots 132 and 130; and the ribs 180 are forced into and deform the plastic material of flange wall segments 126f and 126g for providing a press fit and securely retaining the sleeve 160 in aperture 120 and thus in flange 115.

It is further understood that, when the sleeve 160 is press fit into aperture 120, the arms 162 and 164 of sleeve 160, by virtue of their metal construction, at least partially crush the plastic ribs 138 formed on the exterior surface of the interior wall segments 127a and 127b of flange 115 for providing a secure press-fit and retention of the sleeve 160 in aperture 120 and thus the flange 115.

It is still further understood that the ribs 180 on insert 160 are adapted to contact and slide against the ramp surfaces 134 and 136 on wall portions 126f and 126g of wall 126 and that the insert 160 is adapted to abut and slide against the peripheral edge ramp 135 of wall 126 to guide the insert 160 into the flange aperture 120 during the insertion and assembly process. Specifically, it is understood that, upon insertion, contact between the ribs 180 and the wall surfaces 134 and 136 initially causes the base 166 of the insert 160 to slide back into contact with the wall segment 126c and is followed by contact between the distal end of the sleeve arms 162 and 164 and the vertical interior surface of the respective wall portions 126g and 126f respectively after the ribs 180 and the arms 162 and 164 clear the respective ramp surfaces 136 and 134 for securing and retaining the sleeve 160 in aperture 120.

Moreover, and although not described herein in any detail, it is understood that the sleeve 160 is inserted into the aperture 140 of flange 116 in the same manner as described above with respect to the sleeve 160 in flange 115 and thus the description above is incorporated herein by reference with respect to the means and method for inserting and securing the sleeve 160 in flange 116.

Referring back to FIG. 1, it is noted that, after the sleeve 160 is inserted into the opening 120 in flange 115, the sleeve 160, and wall portion 126e of wall 126 in combination define and form an oval-shaped opening 120 while, after the sleeve 160 is inserted into the opening 140 of flange 116, the sleeve 160 and wall portion 127e of wall 127 in combination define and form a circular-shaped opening 140 as a result of the location of the respective interior arcuate wall portions 126e and 127e of respective walls 126 and 127 relative to the opposed arcuate wall segments 126c and 127c respectively as described in more detail above.

Thus, in accordance with the present invention, the same size U-shaped insert 160 can be used to create either a circular or oval-shaped aperture in a mounting flange simply by adjusting the configuration of only one of the wall portions of the wall defining the respective mounting apertures.

Housing 100 is securable to a vehicle using a fastener 170 (FIG. 2) such as a rivet, bolt, or screw or the like which includes a cap or head 172, a flange 173 surrounding the head 172, and outer threads 174. Fastener 170 is adapted to pass through the sleeve 160 in each of the respective flange apertures 120 and 140 and mate with a threaded aperture (not shown) on a vehicle component such as, for example, the floor of a vehicle. When fastener 170 is tightened into the threaded aperture (not shown) defined in the floor of the vehicle, the flange 173 of fastener 170 is compressed against the top surface of the respective flanges 115 and 116 and associated insert 160 to securely retain the flanges 115 and 116, the plate 102 the housing 100, and thus the pedal assembly 20 to the floor of the vehicle.

Although not shown or described in any detail, it is understood that the pedal assembly 20 according to the present invention can mount to a firewall or pedal rack by means of an adjustable or non-adjustable position pedal box rack.

Figure 5:
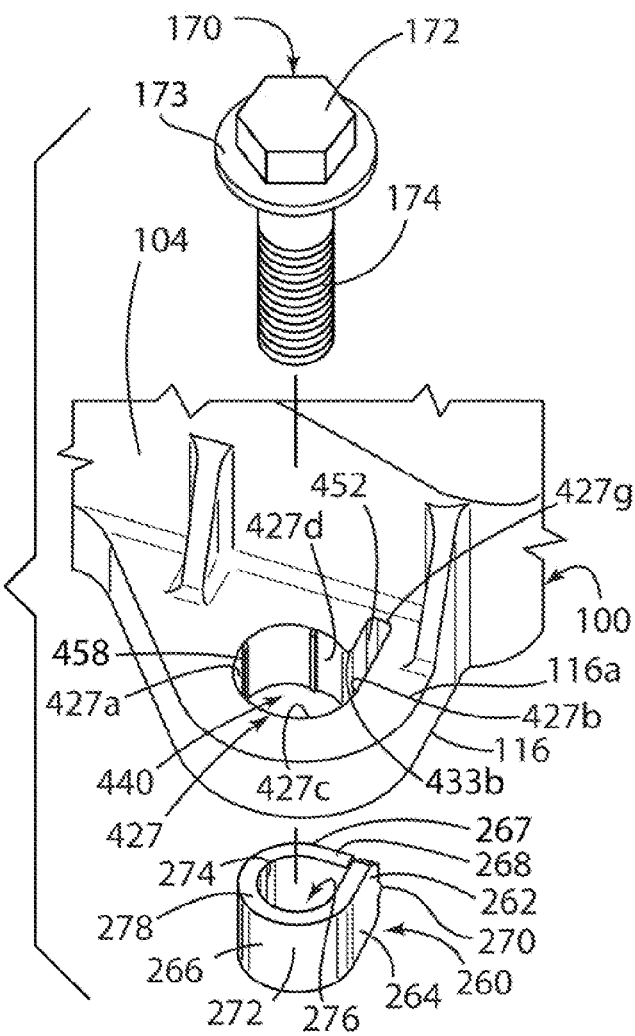
FIG. 5 is an enlarged, broken, exploded, perspective view of the second mounting bracket of the pedal mounting assembly with another embodiment of a mounting insert in accordance with the present invention.
Figure 6:
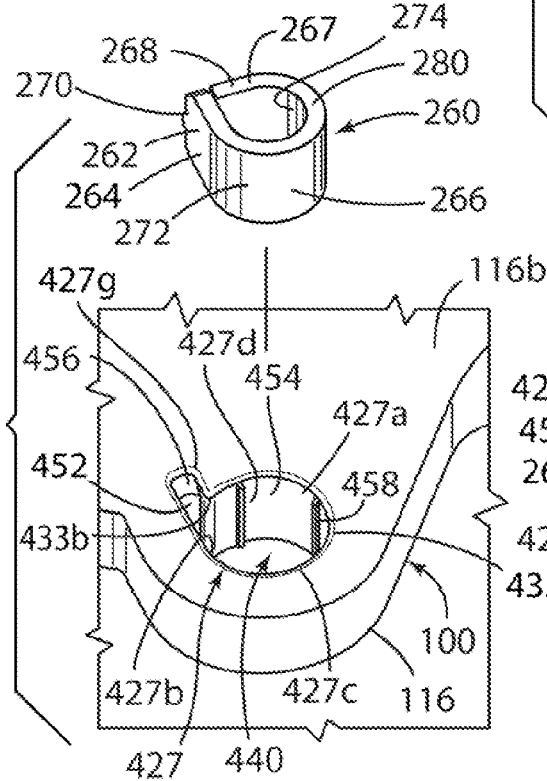
FIG. 6 is an enlarged, broken, exploded, perspective view of the other side of the second mounting bracket and associated mounting insert shown in FIG. 5.
Figure 7:
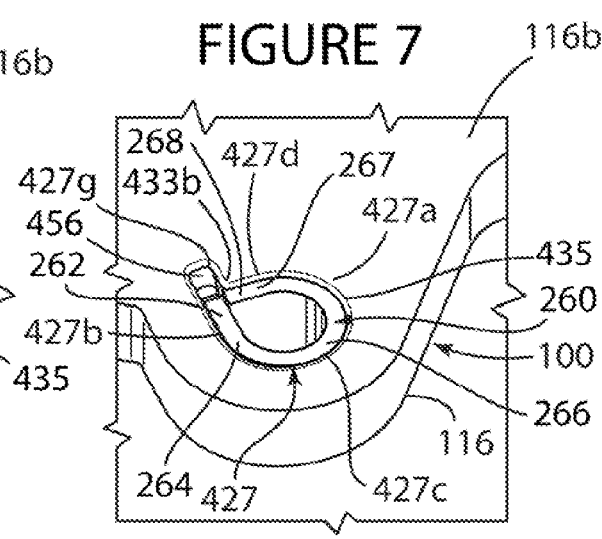
FIG. 7 is an enlarged, broken, perspective view of the second bracket with the mounting insert of FIGS. 5 and 6 press-fitted therein.

FIGS. 5-7 depict another mounting insert embodiment 260 adapted for fitting and retention into an alternate aperture or opening embodiment 440 defined in the mounting flange 116 of pedal housing 100.

The sleeve or insert 260 is defined by a continuous elongate strip of metal which has been stamped, bent, and shaped in a manner to form a generally round or circular sleeve or insert 260. More specifically, insert 260 includes a first distal end portion 262, a first straight portion 264 extending away from the distal end portion 262, an arcuate base portion 266 extending from the straight portion 264, a second straight portion 267 extending from the arcuate base portion 266, and a second distal end portion 268 at the end of the second straight portion 267. The arcuate portion 266 defines a portion which extends away from the straight portion 264 and has been bent first in a direction normally away from the straight portion 264 and then back towards the straight portion 264 into a relationship wherein the second straight portion 267 is disposed generally normal to the first straight portion 264 and the distal end portion 268 is abutted against the outside surface of, and is disposed in a relationship generally normal to, the first distal end portion 262.

The metal strip of material defining the insert 260, and thus the insert 260, includes an outer surface 272, an inner surface 274 defining a central circular opening or aperture 276, and opposed top and bottom surfaces 278 and 280 respectively. The distal end face of the first distal end portion 262 also includes a rib 270 projecting outwardly therefrom in an orientation generally normal to and between the inner and outer surfaces 272 and 274 respectively.

Aperture or opening 440 (FIGS. 5-7) is generally circular in shape and is defined by a generally continuous and arcuate interior vertical surface or wall 427 which extends through and between the top and bottom surfaces 116a and 116b of the flange 116. The wall 427 includes an elongate interior straight wall segment 427b, an arcuate interior base wall segment 427c extending from the straight segment 427b and located adjacent the peripheral outside edge of flange 116, an arcuate wall segment 427a extending from the arcuate wall segment 427c and located opposite the straight wall segment 427b, and another straight wall segment 427d extending from the arcuate wall segment 427a and located opposite the arcuate wall segment 427c.

A generally U-shaped end wall portion 427g is located between the one end of the straight wall segment 427b and an end of straight wall segment 427d and defines a generally U-shaped groove or slot or recess 452 which opens into the aperture 540. A retention finger 433b is defined between the arcuate wall 427a and the groove 452.

The end wall portion 427g further includes a guide surface or face or ramp 456 (FIGS. 6 and 7) which slopes downwardly from the surface 116b of flange 116 in the direction of the opposite surface 116a of flange 116 and into the slot 452.

Selected ones of the wall segments of wall 427 also include one or more generally vertically oriented crush ribs 458 which project outwardly from the respective outer faces thereof and extend between the opposed surfaces 116a and 116b of the flange 116.

Further, and as shown in FIGS. 6 and 7, the wall 427 includes a continuous peripheral edge 435 on flange surface 116b which is beveled so as to define a guide or ramp surface for the mounting insert 260.

As shown in FIG. 6, the insert 260 is press-fitted into the aperture 440 in flange 116 in the same general manner as described above with respect to the insert 160 into a relationship wherein the outer surface 272 of the straight portion 264 of insert 260 is abutted against the exterior face of the straight wall segment 427b of interior flange wall 427, the outside surface 272 of arcuate portion 266 of insert 260 is abutted against, and follows the contour of, the exterior face of the arcuate wall segments 427c and 427a of interior flange wall 427, the outside surface 272 of the straight portion 267 of insert 260 is abutted against the exterior face of the straight wall segment 427d of the wall 427, and the distal end portion 268 of insert 260 is abutted against the retention finger 433b defined on flange wall segment 427d.

Moreover, and although not described in any detail, it is understood that upon insertion, the rib 270 on the insert 260 engages with the ramp surface 456 on flange surface 116b in the same general manner as the ribs 180 on insert 160 engage with the ramp surfaces 134 and 136 on flange 115 to accomplish the same result as the ribs 180 on insert 160, i.e., to assist in the insertion process and provide for a secure retention and press-fit of the insert 260 in the aperture 440, and thus the description above with respect to insert 160 is incorporated herein by reference.

FIGS. 8-10 depict yet a further mounting insert embodiment 360 adapted for fitting and retention into another alternate generally oval-shaped aperture embodiment 520 defined in mounting flange 115 of pedal housing 100.

The sleeve or insert 360 is defined by a continuous elongate strip of metal which has been bent and shaped in a manner to form a generally oval-shaped sleeve or insert 360. More specifically, insert 360 includes a first distal end portion 362, a first straight portion 364 extending away from the first distal end portion 362, an arcuate base portion 366 which extends away from the first straight portion 364, a second straight portion 368 which extends from the arcuate portion 366 in a relationship spaced, opposed, and parallel to the first straight portion 364, a third straight portion 370 which extends from the second straight portion 368 in a relationship normal to the second straight portion 368 and in the direction of, and generally normal to, the first straight portion 364, and a second distal end portion 372 at the end of the third straight portion 370 which is disposed in a relationship abutting and normal to the first distal end portion 362.

Thus, in the embodiment shown in FIGS. 8-10, the metal strip of material defining the insert 360, and thus the insert 360, includes an outer surface 376 and an inner surface 378 defining a central, generally oval-shaped opening or aperture 380.

The first distal end portion 362 additionally includes a rib 374 (FIG. 8) projecting outwardly from the exterior face thereof in an orientation generally normal to and between the inner and outer surfaces 376 and 378 respectively.

The opening or aperture 520 is defined in part by a generally U-shaped interior vertical and continuous flange surface or wall 526 which extends generally normally between the respective top and bottom flange surfaces 115a and 115b. Wall 526 includes opposed, spaced-apart, parallel elongate straight interior wall segments 526a and 526b, an arcuate base wall segment 526c located adjacent the arcuate outside periphery of the flange 115 and extending between the first ends of the two straight segments 526a and 526b, and a generally straight interior wall segment 526d opposite the arcuate base segment 526c and between and joining the opposite second ends of the two straight segments 526a and 526b.

A generally arcuate U-shaped end wall portion 526g is located between the straight wall segment 526b and the straight wall segment 526d and defines a generally U-shaped groove or slot or recess 532 which opens into the aperture 520.

The wall portion 526g includes a guide surface or face or ramp 536 which slopes inwardly and downwardly from the surface 115b of flange 115 in the direction of the surface 115a of flange 115.

Each of the wall segments 526a and 526b includes one or more spaced-apart, generally vertically oriented crush ribs 538 which project outwardly from the respective outer face thereof and extend between the opposed surfaces 115a and 115b of the flange 115.

Further, and as shown in FIGS. 9 and 10, the wall 526 includes a continuous peripheral edge 531 on flange surface 115b which is beveled and defines a guiding surface for mounting insert 360 as described in more detail below.

The insert 360 is press fit into the aperture 520 in flange 115 in the same general manner as described above with respect to the insert 160 and aperture 120 into a relationship wherein the outer surface 376 of respective straight segments 364 and 368 of insert 360 are abutted against the exterior face of respective straight wall portions 526b and 526a of the flange wall 526, the outer surface 376 of arcuate base segment 366 of insert 350 is abutted against, and follows the contour of, the arcuate wall base portion 526c of the flange wall 526, and the outer surface 376 of the straight segment 370 of the insert 360 is abutted against the outer surface of the straight wall portion 526d of wall 526 and the retention finger 529b. The ribs 538 on wall 526 are crushed by the insert 360 upon insertion thereof into the aperture 520 for providing a secure press fit.

Moreover, and although not described in any detail, it is understood that, upon insertion, the rib 374 on the insert 360 engages with the ramp surface 536 on flange surface 115b and extends into the slot 532 in flange 115 in the same general manner as the ribs 180 on insert 160 engage with the ramp surfaces 134 and 136 on flange 115 to accomplish the same result as the ribs 180 on insert 160, i.e., to assist in the insertion process and provide for a secure retention and press-fit of the insert 360 in the aperture 520, and thus the description above with respect to the insert 160 is incorporated herein by reference.

Numerous variations and modifications of the embodiments described above may be effected without departing from the spirit and scope of the novel features of the invention. It is to be understood that no limitations with respect to the mounting assembly and inserts illustrated herein are intended or should be inferred. It is, of course, intended to cover by the appended claims all such modifications as fall within the scope of the claims.

What is claimed is:

1. A pedal assembly for a vehicle comprising:
a housing including a generally U-shaped interior wall defining an opening, the generally U-shaped interior wall including an arcuate base wall segment and opposed, spaced-apart straight wall segments;
a generally U-shaped sleeve fitted in the opening; and
a fastener extending through the sleeve for fastening the pedal assembly to the vehicle, wherein the housing includes a plate having opposed exterior surfaces, the interior wall being formed in the plate and the interior wall defines a pair of slots and a curved wall segment between the pair of slots, the pair of slots and the curved wall segment extending in a direction transverse to the opposed exterior surfaces of the plate and located opposite and spaced from the arcuate base wall segment of the interior wall and the sleeve includes a pair of arms having respective distal ends fitted into the pair of slots respectively.

2. A mounting assembly comprising:
a plate including opposed top and bottom surfaces and an interior wall defining an aperture, an arcuate base wall segment, and first and second guide surfaces opposite and spaced from the arcuate base wall segment defining first and second slots opposite and spaced from the arcuate base well segment which open into the aperture, the first and second slots extending in a direction transverse to the opposed top and bottom surfaces of the plate; and
a generally U-shaped sleeve fitted in the aperture of the plate and including first and second opposed and spaced-apart arms with respective first and second distal ends extending into the respective first and second slots of the plate, wherein the interior wall includes a curved wall segment located opposite and spaced from the arcuate base wall segment, the curved wall segment being spaced a distance from the arcuate base wall segment to define a generally circular aperture in the plate.

3. A pedal mounting assembly comprising:
a first mounting bracket including a first interior wall defining a first opening, a first wall segment, first and second slots opposite and spaced from the first wall segment, and a second wall segment between the first and second slots and opposite and spaced from the first wall segment of the first interior wall;
a second mounting bracket including a second interior wall defining a second opening, a first wall segment, first and second slots opposite and spaced from the first wall segment, and a second wall segment between the first and second slots and opposite and spaced from the first wall segment of the second interior wall; and
first and second U-shaped sleeves including a base and first and second spaced-apart arms respectively, the first and second sleeves being fitted in the first and second openings defined in the first and second mounting brackets respectively and the first and second arms respectively being fitted in the first and second slots defined in the first and second mounting brackets respectively, the first and second wall segments of the first interior wall defining the first opening in the first mounting bracket being spaced a first distance from each other for forming a first fastener aperture in the first mounting bracket that is generally oval in shape and the first and second wall segments of the second interior wall defining the second opening in the second bracket being spaced a second distance from each other for forming a second fastener aperture in the second mounting bracket that is generally circular in shape, wherein each of the first and second mounting brackets includes opposed surfaces, the first and second interior walls in the first and second mounting brackets respectively are each generally U-shaped, the first wail segment of the respective first and second interior walls of the respective first and second mounting brackets being arcuate and the second wail segment of the respective first and second interior walls of the respective first and second mounting brackets being curved, the first and second arms of the respective first and second sleeves extending outwardly from opposed ends of the base of the first and second sleeves in an opposed, spaced-apart, and parallel relationship, the first and second slots defined in each of the first and second mounting brackets extending in an opposed, spaced-apart and side-by-side relationship transverse to the opposed surfaces of the first and second mounting brackets respectively.

\* \* \* \* \*